United States Patent Office 3,434,797
Patented Mar. 25, 1969

3,434,797
PROCESS FOR TREATMENT OF HYDROCHLORIC ACID WASTE PICKLE LIQUOR
Robert A. Taylor, Wilmington, Del., and Frederick G. Krikau, Dolton, Ill.; said Taylor assignor to E. I. du Pont de Nemours and Company, Wilmington, Del., a corporation of Delaware, said Krikau assignor to Interlake Steel Corporation, Chicago, Ill., a corporation of New York
No Drawing. Filed July 27, 1967, Ser. No. 656,364
Int. Cl. C01f 11/24
U.S. Cl. 23—90         2 Claims

ABSTRACT OF THE DISCLOSURE

A process for removal of iron solids from hydrochloric acid waste pickle liquor by maintaining the system pH between 8–10 while the waste pickle liquor and a lime slurry, each at a temperature of from 180°–210° F., are simultaneously introduced into a reaction vessel. The pH and the temperature are maintained for at least 5 hours. The iron is precipitated out as iron oxide crystals ($Fe_3O_4$) and is separated from the system by suitable means. The clear liquor contains dissolved calcium chloride.

BACKGROND OF THE INVENTION

This invention relates to removal of iron from a hydrochloric acid waste pickle liquor containing dissolved iron in said waste pickle liquor.

Waste hydrochloric acid liquors from pickling operations in the iron and steel industry typically contain 20 to 30% by weight of $FeCl_2$ and one-half to one and one-half percent acidity as HCl. These liquors may contain small amounts of other metal chlorides, lubricants, inhibitors, hydrocarbons and other organics and impurities. The removal of the iron from the liquor has been a problem of long standing in the industry.

My invention affords a new and effective method for removal and recovery of the iron oxide while affording a useful liquor residue of $CaCl_2$. This residue liquor can be concentrated and used for control of ice and snow on highways, for dust control on secondary roads, for freeze proofing coal and other ores, and for an addition in concrete mixes to give a quicker initial set.

The recovered iron oxides, being essentially pure, can be utilized in the metal industry as a raw material.

SUMMARY OF THE INVENTION

This invention relates to a process for the treatment of waste hydrochloric acid pickle liquor when a lime slurry and the waste pickle liquor, each being maintained at a temperature of from 180° F. to the boiling point of the liquid are added to a reaction vessel. During the addition and for at least 5 hours thereafter the system is maintained within this temperature range, air is bubbled through this mixture and the mixture is agitated.

The improvements over known methods are the simultaneous addition of the lime slurry and pickle liquor to the reaction vessel, air oxidation of the dissolved iron to $Fe_3O_4$; the maintenance of the resultant mixture at a pH between 8–10 throughout the reaction; the constant agitation of the mixture and the temperature control of the mixture throughout the reaction.

At the end of at least 5 hours the system is separated into a solid residue and an aqueous phase. The solid residue is comprised essentially of magnetic iron oxide, $Fe_3O_4$. The aqueous phase is comprised of $CaCl_2$ in solution.

It is necessary that the pH of the reaction mixture be maintained at 8 or above to accomplish the almost total recovery of the dissolved iron from the pickle liquor. It has been found that a pH lower than 8 will result in substantially reduced iron recovered from the waste pickle liquor. It is believed that this is a result of the effect of the chloride ion on the solubility of the iron. Therefore, it is essential to operate the process of this invention at a pH of 8 or above in order to recover up to 99+% of the iron content of the waste pickle liquor.

The lime slurry used in the practice of this invention consists of from 10 to 30% by weight of calcium hydroxide.

The function of the air bubbled through the reaction mass is to provide a source of oxygen for the oxidation of the iron salts present in the pickle liquor. Oxygen could also be employed for this purpose but is not preferred because of its higher cost.

The heat used to raise the solution to a temperature suitable for this reaction can be supplied from any of the readily available sources such as from the coking or smelting operations.

It is also possible to employ the instant process when the pickle liquor employed is a mixture of sulfuric and hydrochloric acids with equally successful results as when the pickle liquor is hydrochloric acid alone.

DESCRIPTION OF THE PREFERRED EMBODIMENTS

The process of this invention can be carried on as either a continuous operation or as a batch operation. In each type operation the iron salts present in the waste pickle liquor are oxidized to magnetic iron oxide, $Fe_3O_4$. 99+% of the iron present in the waste pickle liquor is converted to iron oxide crystals which can be separated by physical means such as filtering. For this purpose filter apparatus of the ordinary platen, vacuum disc or drum types are suitable. If desired, the iron oxide solids can also be removed by centrifuging.

The following examples are presented to illustrate the operation of the process of this invention:

Example 1

In a batch operation separate streams of waste pickle liquor containing 20 to 30% ferrous chloride and ½ to 1½% hydrochloric acid and a 25% lime slurry stream, each preheated to 195–200° F. are introduced simultaneously into a reactor equipped with an agitator, air sparge and steam sparge. The liquor is fed in at a rate of about 3.8 lb./min. and the lime slurry at a rate of 2.5 lb./min. with a pH of 8 being maintained in the reactor by adjustment of the liquid flow. After the reactor is filled, hold up time is 5 hours. During this time the pH is maintained at 8 and the temperature at 200° F. with constant agitation. Air is blown in at the rate of about 8 cu. ft./min. After 5 hours have elapsed the slurry is pumped from the reactor to a rotary vacuum drum filter. The filter cake contains about 45–50% moisture.

Example 2

Into a continuous neutralizer containing 300 gallons of agitated reaction slurry at 200° F. and a pH of 8.5 balance streams of lime slurry and pickle liquor are added continuously. The lime rate is 13.7 lb. per minute and the acid flow which is automatically regulated by the pH controller, averages 21.4 lb./min. and a small amount of steam is admitted to the slurry to maintain the temperature. Air is sparged continuously into the reactor at 44 c.f.m.

The slurry is continuously withdrawn to maintain a constant level in the neutralizer. Holdup time in the reactor averages about 5 hours. The slurry is fed to a continuous filter which discharges a clear stream of water at a pH of 8.5 and a stream of filter cake, which contains about 45–50% moisture. The clear water contains less than 2 p.p.m. of iron and about 16.3% calcium chloride. The calcium chloride concentration is dependent upon the amount of condensate in the steam line.

We claim:
1. In a process for the treatment of a hydrochloric acid waste pickle liquor containing $FeCl_2$ by adding a lime slurry and the pickle liquor to a reaction vessel, to form insoluble iron oxide ($Fe_3O_4$) and then separating the resultant solid phase and aqueous phase the improvements comprising:
   (a) simultaneously adding the waste pickle liquor and lime slurry to the reaction vessel each being heated to a temperature of from 180° F. to the boiling point of the liquid;
   (b) bubbling air through this mixture;
   (c) maintaining the mixture at a pH of from 8 to 10 at all times during the reaction;
   (d) agitating the mixture during the reaction;
   (e) maintaining the mixture at a temperature of from 180° F. to the boiling point of the mixture; and
   (f) the conditions of (b), (c), (d), and (e) above being maintained for at least 5 hours.

2. The process of claim 1 wherein the pH of the waste pickle liquor-lime slurry mixture is maintained at 8.5 and the temperature is maintained at 200° F. for 5 hours.

References Cited

UNITED STATES PATENTS

| | | | |
|---|---|---|---|
| 1,287,939 | 12/1918 | Fireman | 23—200 |
| 2,423,385 | 7/1947 | Hixson et al. | 23—200 XR |
| 2,433,458 | 12/1947 | Kahn et al. | 23—200 |
| 2,636,807 | 4/1953 | Ross et al. | 23—90 |
| 3,261,665 | 7/1966 | Rathmell | 23—200 XR |

OTHER REFERENCES

Hoak et al.: "Lime Treatment of Waste Pickle Liquor," Industrial and Engineering Chemistry, vol. 39, No. 2, February 1947, pp. 131–135, inclusive.

EDWARD STERN, *Primary Examiner.*

U.S. Cl. X.R.

23—122, 200